(12) United States Patent
Jaenker

(10) Patent No.: US 6,294,859 B1
(45) Date of Patent: *Sep. 25, 2001

(54) ELECTROSTRICTIVE OR PIEZOELECTRIC ACTUATOR DEVICE WITH A STROKE AMPLIFYING TRANSMISSION MECHANISM

(75) Inventor: Peter Jaenker, Garching (DE)

(73) Assignee: EADS Deutschland GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,356

(22) Filed: Sep. 9, 1998

(30) Foreign Application Priority Data

Sep. 10, 1997 (DE) ............................................. 197 39 594

(51) Int. Cl.$^7$ ................................................. H01L 41/04
(52) U.S. Cl. .............................................................. 310/328
(58) Field of Search ............................................. 310/328

(56) References Cited

U.S. PATENT DOCUMENTS

| 4,570,095 |   | 2/1986  | Uchikawa . |         |
|-----------|---|---------|------------|---------|
| 4,703,215 | * | 10/1987 | Asano      | 310/328 |
| 4,706,230 | * | 11/1987 | Inoue et al. | 367/174 |
| 4,769,569 | * | 9/1988  | Stahlhuth  | 310/328 |
| 4,808,874 | * | 2/1989  | Stahlhuth  | 310/328 |
| 4,933,591 | * | 6/1990  | Stahlhuth  | 310/328 |
| 4,937,489 |   | 6/1990  | Hattori et al. | 310/328 |
| 4,952,835 | * | 8/1990  | Stahlhuth  | 310/328 |
| 5,319,257 |   | 6/1994  | McIntyre   | 310/328 |

OTHER PUBLICATIONS

"Development of High Performing Piezoelectric Actuators for Transport Systems", by Peter Jaenker et al.; an article published at the "Actuator 98" Conference in Bremen Germany on Jun. 17 to 19, 1998.

Fachbeilage Mikroperipherik, me Bd.4 (1990) Heft 6 "Piezoelektrische Aktoren"; Salomon, Schadebrot; pp. 88 to 91 in German periodical DE–Z Mikroelektronik.

* cited by examiner

*Primary Examiner*—Elvin Enad
*Assistant Examiner*—Peter Medley
(74) *Attorney, Agent, or Firm*—W. F. Fasse; W. G. Fasse

(57) ABSTRACT

An actuator device (2) includes a piezoelectric or electrostrictive solid state actuator element (6) that is elongated upon application of an electric voltage thereto, and a transmission mechanism (8) that amplifies the stroke displacement of the actuator element. The transmission mechanism (8) includes a plurality of rigid frame members (12), including unitary frame members (12.1, 12.2) and divided frame members (12.3), and elastically flexible joints (10) that respectively interconnect the frame members. Each one of the divided frame members (12.3) is made up of a plurality of separate parallel link rods (16). Each flexible joint (10) is made up of a plurality of individual parallel hinge members (18) that respectively connect an end of each one of the link rods (16) to the adjacent unitary frame member (12.1, 12.2). By this division of the flexible joints and of the divided frame members into parallel sub-components, the cross-sectional thickness of each individual hinge member is reduced, and thereby the bending stiffness and the outer fiber strain of the material of the hinge members is significantly reduced while providing the same total tensile strength and tensile stiffness. The link rods of each divided frame member effectively form a parallelogram linkage for moving and guiding the output members (12.1) in a parallel manner.

20 Claims, 2 Drawing Sheets

ELECTROSTRICTIVE OR PIEZOELECTRIC ACTUATOR DEVICE WITH A STROKE AMPLIFYING TRANSMISSION MECHANISM

CROSS-REFERENCE TO RELATED APPLICATION

This application is related to copending U.S. application Ser. No. 09/334,216, filed on Jun. 16, 1999 by the same inventor.

This application is based on and claims the priority under 35 U.S.C. §119 of German Patent Application No. 197 39 594.5, filed on Sep. 10, 1997. The entire disclosure of German Patent Application No. 197 39 594.5 is incorporated herein by reference.

FIELD OF THE INVENTION

The invention relates to an electrostrictive or piezoelectric actuator device including a solid state actuator element that has a variable length upon application of an electrical voltage, and including a transmission mechanism that amplifies the displacement or stroke movements of the actuator element, wherein the transmission mechanism comprises rigid frame members connected to each other by elastically flexible joints.

BACKGROUND INFORMATION

Actuator devices of the above mentioned general type typically include a solid state electrostrictive or piezoelectric element as an actuator, which becomes elongated in a lengthwise direction due to strain induced in the electrostrictive or piezoelectric material upon application of an electrical voltage thereto. The present specification applies to both electrostrictive and piezo-electric actuator elements, which will generally be referred to as electrically strainable solid state actuator elements, which comprise corresponding electrically strainable solid state materials.

Since the electrically induced strain in electrostrictive and piezoelectric materials is rather small in relation to the voltage that is applied to the material, the resulting strain must be amplified or multiplied to provide a sufficient stroke or displacement range to be useful as an actuator in most mechanical or physical applications. For this reason, it is known to provide a laminated stack of layers of electrically strainable solid state material to form a solid state actuator element, so that the total stroke or displacement of the stack element is a series addition of the electrically induced strains of all of the respective solid state material layers. However, even the multiplied displacement achieved by such an electrostrictive or piezoelectric stack element is inadequate for many applications.

Therefore, attempts have been made to provide a mechanical linkage or transmission mechanism, and particularly a step-up transmission mechanism, for amplifying the stroke displacement provided by the solid state actuator element. U. S. Pat. No. 4,937,489 (Hattori et al.) discloses an electrostrictive actuator including at least one electrostrictive element and a transmission mechanism coupled thereto for amplifying the initial displacement of the electrostrictive element. The transmission mechanism consists of a solid and relatively massive metal plate having a groove or cut-out for receiving the actuator element therein, and a plurality of slits so as to form a substantially rectangular frame made of rigid frame members connected to each other by integral, flexible hinge joints formed by thinner slitted or notched areas of the metal plate material. The result is a linkage frame effectively made up of six rigid bodies and six hinges. An elongation of the actuator element causes a deformation of this linkage frame such that a small change in length of the electrostrictive member is kinematically converted into a multiply amplified output stroke provided by one of the linkage bodies of the actuator device.

In view of the rather high tension loads effective on the elastic hinge joints, these hinge joints must have a rather large tensile strength and stiffness, and therefore must have a correspondingly large cross-sectional area. This simultaneously causes the disadvantage that the overall bending stiffness of the bending hinge, and also the outer fiber strain resulting in the material of the hinge due to the bending movement, increase sharply with increasing cross-sectional area of the hinge joint. As a result, the hinge joints, which are appropriately dimensioned for the prevailing loads, cause an elastic return force and bending resistance that acts against the electrically induced length variation of the actuator element and therefore noticeably reduces the effective stroke of the actuator device.

SUMMARY OF THE INVENTION

In view of the above, it is an object of the invention to provide an actuator device of the above mentioned general type, embodied with a compact structure that has a high strength and stiffness in the lengthwise loading direction, yet simultaneously achieves a high energetic efficiency and a long operating lifetime. Particularly, it is an object of the invention to provide a structural arrangement of a transmission mechanism for amplifying the stroke of an electrically strainable solid state actuator element, wherein a sufficient tensile strength is achieved, while reducing the bending stiffness and the resulting outer fiber strain in the hinged joints of the transmission mechanism, and reducing the resistive force of the hinge joints acting counter to the actuating force of the actuating element over a large stroke range, i.e. a large bending range of the joints. The invention further aims to avoid or overcome the disadvantages of the prior art, and to achieve additional advantages, as apparent from the present description.

The above objects have been achieved in an electrostrictive or piezoelectric actuator device according to the invention, including an electrically strainable solid state actuator element and a transmission mechanism adapted to amplify the stroke motion of the actuator element. The transmission mechanism comprises a linkage frame of rigid frame members connected to each other by elastically flexible joints. More specifically, each flexible joint is made up of a plurality of adjacently arranged elastic hinge members having respective parallel extending hinge bending axes. Furthermore, the frame members include unitary frame members and divided frame members that are respectively made up of at least two separate, individual lever arms or link rods. The hinge members of each respective flexible joint are all connected on one side to a single unitary frame member that integrally connects the respective hinge members to each other, and are connected on the other side individually and respectively to the individual link rods that form the respective divided frame member. The individual link rods of a given divided frame member are preferably, but not necessarily, parallel to each other and of equal length.

Thus, according to the invention, the individual flexible joints are divided respectively into a plurality of hinge members, and at least one of the frame members connected to each flexible joint is divided into a respective plurality of individual link rods. Otherwise, the structural parameters of the transmission mechanism, for example especially the total cross-sectional area, and the total tensile strength and stiffness of the flexible joints, can be the same as an arrangement using single flexible joints and only single link rods, because these parameters are directly determined from the load characteristics. Nonetheless, due to the inventive arrangement, the bending stiffness of the flexible joints is reduced significantly, namely proportionally to the square of the respectively selected degree of division of the flexible joints into individual hinge members. As a result of this reduction of the joint stiffness, the elastic return force or counter force exerted by the flexible joints on the transmission mechanism countering the deformation force of the actuator element is also significantly reduced, and the useful stroke of the actuator device is substantially increased. As a further beneficial effect, the outer fiber strain of the material forming the hinge members, relative to the bending angle, is similarly reduced, because the thickness of each individual hinge member is reduced. For this reason, the overall operating life time of the actuating device is considerably improved.

A preferred embodiment of the invention uses a two-fold division of the flexible joints and the divided frame members. Namely, each flexible joint includes two parallel hinge members, and each divided frame member includes two individual link rods. In such an embodiment, the bending stiffness of the flexible joints is already reduced by 75%, and the outer fiber strain in the hinge members is reduced by 50%, in comparison to an otherwise similarly configured and dimensioned bending joint linkage using only unitary flexible joints and unitary frame members.

According to a further preferred detail of the invention, a total of eight frame members are provided and arranged to form an octagonal or eight-sided rod linkage transmission mechanism in which two respectively opposite pairs of sides are formed by the unitary frame members, with the divided frame members respectively connected therebetween. Specifically, two unitary frame members are arranged at the ends of the actuator element to be acted on by the length variation displacement of the actuator element, and the two remaining unitary frame members form the output members from which the amplified displacement can be tapped.

When the above octagonal arrangement is combined with the two-fold division of frame members as described above, the unitary frame members forming the output members are arranged at the sides of the solid state actuator element, and the respective intermediate frame members are divided into two equal-length parallel extending individual link rods, the result achieved is a forceless and jam-free parallel guidance of the output members without requiring additional guidance efforts. Namely, the rod linkage necessarily moves and guides the output members in a parallel manner because the parallel link rods of each divided frame member form a parallelogram linkage.

In order to further reduce the bending stiffness and the outer fiber strain of the material of the flexible joints of the actuator device, an even finer division rather than a two-fold division can be used for the flexible joints and the divided frame members. In this case also, the individual link rods forming the divided frame members preferably have an equal length and are preferably arranged parallel to one another to ensure a forceless parallel guidance of the transmission mechanism and particularly the output members. Namely, the individual parallel link rods of each divided frame member, which are connected together integrally at the ends thereof by the unitary frame members, form respective parallelogram rod linkages that necessarily hold the two unitary frame members, i.e. a respective output member and a respective actuator end block member, parallel to each other.

For reasons of manufacturing efficiency and precision of the finished structure, the frame members including the individual link rods and the hinge members are advantageously integrally formed and embodied. Specifically, the entire transmission mechanism can be formed from a single integral piece of material such as a metal plate or sheet, simply by cutting the required shapes, for example by means of wire spark erosion.

Especially for use in dynamic actuator applications, it is advantageous to provide a pre-biasing spring effective on the transmission mechanism so as to pre-load the transmission mechanism in such a direction as to pre-compress the actuator element. This arrangement avoids external tension loads from being effective on the solid state actuator element itself, which is very load sensitive in this regard.

An alternative embodiment for avoiding external tension loads from affecting the actuator element involves two mechanically serially arranged and interconnected actuators that respectively comprise an actuator element and a transmission mechanism, whereby the actuator elements of the two actuators are oppositely electrically energized, so that one is elongated while the other is contracted. The two transmission mechanisms of the two actuators are both connected to a common output member that couples together the outputs of the two actuators. Such an actuator device has the advantage that thermal elongations are compensated, and a pre-stressing spring is not necessary. Furthermore, the output force of the two actuators is added together, while maintaining the useful working stroke of an individual actuator.

BRIEF DESCRIPTION OF THE DRAWINGS

In order that the invention may be clearly understood, it will now be described in connection with example embodiments, with reference to the drawings, wherein.

DETAILED DESCRIPTION OF PREFERRED EXAMPLE EMBODIMENTS AND OF THE BEST MODE OF THE INVENTION

Figure 1:
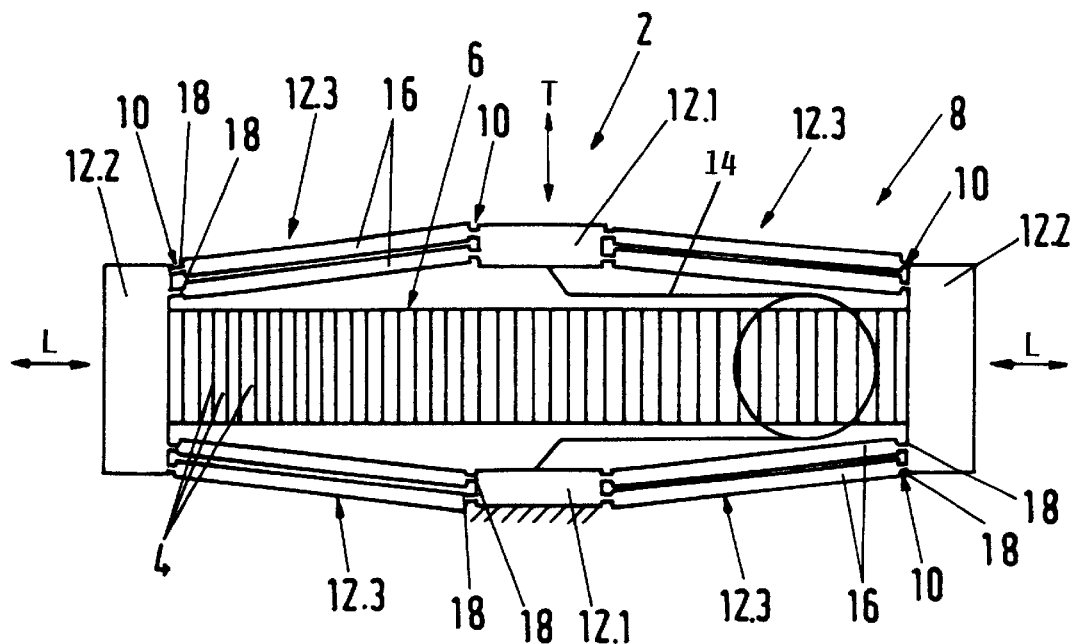
FIG. 1 schematically shows an actuating device according to the invention with a transmission mechanism configured as an octagonal rod linkage, with a two-fold division of the flexible joints and of the divided frame members.

The solid state actuator device 2 shown in FIG. 1 comprises an electrically strainable solid state actuator element 6 and a transmission mechanism 8 in the form of an octagonal rod linkage frame that surrounds the actuator element 6. The actuator element 6 comprises a laminated stack of layers 4 of an electrically strainable solid state material, which is preferably a piezoelectric material but may alternatively be an electrostrictive material. The transmission mechanism 8 comprises rigid frame members 12 that are respectively connected to each other by elastically flexible joints 10.

The frame members 12 include four unitary frame members 12.1 and 12.2, alternatingly arranged with four divided frame members 12.3 to form the sides of the octagon. The four unitary frame members include two actuator element end block members 12.2 arranged at the lengthwise ends of the actuator element 6, and two output members 12.1 arranged laterally to the sides of the actuator element 6 on a plane between the end block members 12.2. The output members 12.1 are thus connected to the end block members 12.2 by respective divided frame members 12.3, whereby the divided frame members 12.3 extend at an obtuse angle of slightly less than 180° relative to the output members 12.1, as measured on the inside angle facing the actuator element 6. This angle is variable as the actuator element is actuated, as will be described below. The angle between the divided frame members 12.3 and the lengthwise axis of the actuator element 6 is necessarily less than 45°, to enable the desired step-up transmission ratio of the transmission mechanism 8.

The transmission mechanism 8 further comprises a spring bail element 14 connected between the two output members 12.1 so as to bias the two output members 12.1 away from each other in a direction perpendicular to the lengthwise direction of the actuator element 6. Thereby the biasing force is effective through the transmission mechanism 8 onto the actuator element 6 so as to pre-stress the actuator element 6 in a compression direction.

If an electrical voltage is applied to the piezoelectric layers 4, via conductor leads (not shown) in any conventional manner, the actuator element 6 will responsively be elongated in the lengthwise direction and thereby push the end block members 12.2 away from each other in the lengthwise direction L. As a result, the divided frame members 12.3 extending at an angle from the end block members 12.2 are tilted inwardly toward the lengthwise axis of the actuator element 6 while moving the output members 12.1 inwardly toward each other in a transverse direction T, against the biasing force of the spring bail element 14. Due to the selected transmission kinematics, and particularly the relative steep angular relationship between the divided frame members 12.3 and the lengthwise direction L, the stroke displacement of the output members 12.1 relative to each other is a multiple or an amplification of the initial elongation of the actuator element 6 applied to the end block members 12.2.

The bottom output member 12.1 may be locationally anchored or fixed to a rigid component, while the resulting stroke displacement of the actuator device 2 is taken off from the upper output member 12.1, relative to the fixed or anchored bottom output member 12.1.

If the electrical voltage is switched off so that the piezoelectric layers 4 are de-energized, then the actuator element 6 will tend to contract to its resting length, whereby the contraction is reinforced by the biasing force of the spring bail element 14, such that the output members 12.1 return outwardly in the direction to their initial positions as illustrated. If an opposite electrical voltage is applied to the piezoelectric layers 4, the actuator element 6 will contract further in the lengthwise direction L to a contracted length that is shorter than the resting length. Thereby, the output members 12.1 will move outwardly even farther apart from each other in the transverse direction T. If an electrostrictive material rather than a piezoelectric material is used for the actuator element 6, such a strain reversal upon reversal of the energizing voltage will not occur, but rather a positive strain would be induced regardless of the polarity of the applied voltage.

Figure 2A:
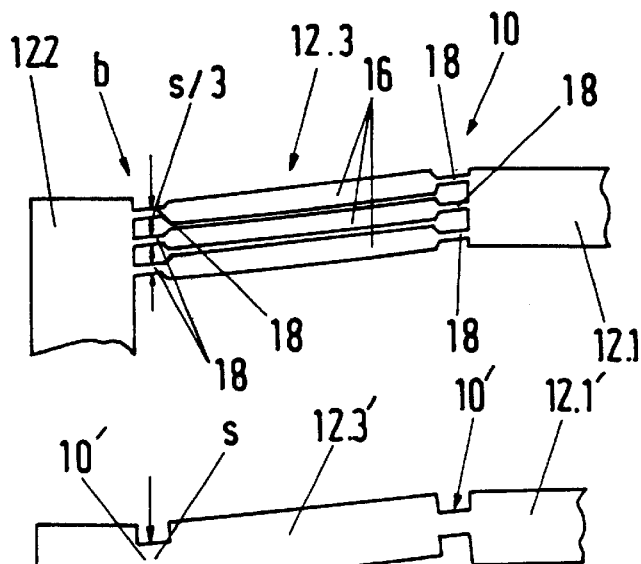
FIG. 2A is an enlarged detail view of an actuator device according to the invention similar to that of FIG. 1, but having a three-fold division of the flexible joints and of the divided frame members.

According to the invention, particularly as shown in FIGS. 1 and 2A, the divided frame members 12.3 that interconnect the end block members 12.2 and the output members 12.1 are respectively divided into a plurality of parallel individual link rods 16, and the flexible joints 10 are similarly divided into a plurality of parallel individual hinge members 18. These features of the inventive arrangement will be discussed in detail below. First, however, to allow a clear understanding of these features, the comparative example of FIG. 2B will now be described.

Figure 2B:
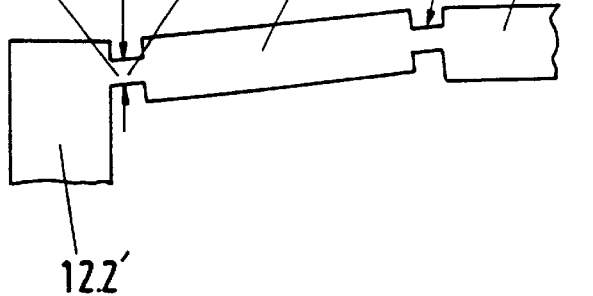
FIG. 2B is a schematic view similar to that of FIG. 2A, but showing a comparative example of a rod linkage configuration having a unitary, undivided frame member and a unitary hinge member in place of the divided frame member and divided flexible joint according to the invention, but otherwise having the same dimensions as in FIG. 2A.

FIG. 2B shows a comparative example that is generally similar to the inventive arrangement of the actuator element and transmission mechanism, except that the frame members 12.3' extending at an angle and interconnecting the end block members 12.2' and the output members 12.1' are embodied as one-piece solid unitary frame members, similarly to the frame members 12.1' and 12.2'. Also, each flexible joint 10' respectively consists of a single bending element or hinge member, which must have a certain cross-sectional thickness s for a given width in order to provide a sufficient tensile strength and tensile stiffness in consideration of the tensile loads that will be effective thereon. Simultaneously, however, the bending stiffness of the flexible joints 10', i.e. the return force or resistance force exerted by the flexible joints 10' against the bending motion thereof, is also a function of the cross-sectional thickness s and increases corresponding to the third power of s. Similarly, the outer fiber strain effective on the material of the flexible joint 10 for a given bending angle is linearly dependent on the cross-sectional thickness s. Thus, an increase of the thickness s undesirably and substantially increases the outer fiber strain as well as the bending stiffness.

The invention recognizes that it is beneficial to reduce the cross-sectional thickness of each respective hinge member or bending element, while still achieving the total required tensile strength, tensile stiffness, and bending strength. This is achieved according to the invention as shown in FIGS. 1 and 2A.

Namely, the elastically flexible joints 10 and the frame members 12.3 are each multiply divided into a plurality of sub-components, whereby the arrangement of FIG. 1 demonstrates a two-fold division of these components, and FIG. 2A demonstrates a three-fold division of these components. Thus, each divided frame member 12.3 comprises two (according to FIG. 1, or three according to FIG. 2A) separated, equal length, parallel individual lever arms or link rods 16, and each flexible joint 10 comprises two (according to FIG. 1, or three according to FIG. 2A) individual bending elements forming hinge members that extend in the tension direction and are stacked parallel adjacent to one another. Each respective hinge member 18 is arranged and interconnected between a respective end of one of the individual link rods 16 and one of the unitary frame members 12.1 or 12.2. Thereby, a respective four-sided linkage parallelogram is formed respectively by two parallel link rods 16, an end block member 12.2, an output member 12.1, and the four hinge members 18 inter-connecting these rigid frame members.

Furthermore, due to the above described n-fold division of each flexible joint 10 into n respective parallel hinge members 18, the cross-sectional thickness of each respective hinge member may be reduced to s/n, whereby the bending stiffness of each flexible joint 10 is reduced by the factor $1/n^2$, while otherwise maintaining the same parameters as in comparative FIG. 2B, namely the same cross-sectional width and the same total sectional thickness s of each flexible joint 10, and therewith the same tensile strength and tensile stiffness.

Accordingly, the arrangement in FIG. 1, using a two-fold division of each flexible joint 10, wherein the cross-sectional thickness of each individual hinge member 18 is only half of the total thickness s illustrated in FIG. 2B, results in a reduction of the bending stiffness to only 25% of the undivided frame and flexible joint construction according to FIG. 2B. Similarly, a three-fold division of the flexible joints 10 as shown in FIG. 2A results in a reduction of the cross-sectional thickness of each individual hinge member 18 to s/3, and accordingly results in a reduction of the bending stiffness to 1/9 of an otherwise equivalent actuator device as shown in FIG. 2B. The elastic return or resistance force exerted by the flexible joints 10 against the bending force and against the electrically induced length variation of the actuator element 6 will be reduced to the same degree as the reduction in the bending stiffness, so that the useable working stroke of the overall actuator device 2 is substantially increased.

As another beneficial effect, the outer fiber strain of the material of the hinge members 18 caused by the bending motion of the flexible joints 10 will also be reduced by the factor 1/n due to the reduced cross-sectional thickness of each respective hinge member 18. Thereby, the long term durability of the actuator device 2 and especially of the flexible joints 10 is considerably improved.

In addition to the division of the flexible joints 10 into a number n of individual hinge members 18, the frame members 12.3 are respectively divided into the same number n of separate, parallel extending, individual lever arms or link rods 16, that are respectively connected to the adjoining unitary frame members 12.1 and 12.2 by respective individual hinge members 18. This division of the frame members 12.3 ensures a jam-free kinematics of the transmission mechanism 8, so that no jamming forces or additional guiding forces are applied to the output members 12.1. Namely, the stroke displacement motion caused by the length variation of the actuator element 6 is amplified and transmitted to the output members 12.1, while only being counteracted by the bending return forces or bending resistance forces exerted by the bending stiffness of the hinge members 18, which has been advantageously reduced according to the invention as described above. In the illustrated embodiment using an octagonal transmission mechanism 8, the individual link rods 16 of the divided frame member 12.3 are respectively arranged parallel to one another and respectively have the same length, so as to provide the necessary parallelogram guidance of the output members 12.1, thereby ensuring the jam-free and force-free kinematic operation of the illustrated transmission mechanism 8.

While it is possible that the various components of the transmission mechanism 8, namely the frame members 12.1, 12.2, and 12.3 as well as the hinge members 18, are individually fabricated and assembled together by any known technique of any known materials having sufficient strength, it is preferred to fabricate the entire transmission mechanism 8, including the individual link rods 16 of the divided frame members 12.3 and the individual hinge elements 18 of the divided flexible joints 10, as an integral part from a one-piece starting material, which may be a metal block or a metal plate for example. The necessary shapes and configurations can be achieved by any suitable cutting, cut-out, or notching technique, but may preferably be achieved by wire spark erosion. These features achieve an advantageous production efficiency and a high accuracy of the finished part.

The division of the divided members 12.3 and of the flexible joints 10 is carried out by simply providing a slit between the parallel adjacent link rods 16, and by notching or grooving the link rods 16 from both sides to prepare the reduced-thickness hinge members 18. With this arrangement, each hinge member 18 is substantially coaxial or coplanar with a central longitudinal axis or plane of the respective connected link rod 16, and the lines of force transmission through the frame members and through the flexible joints 10 essentially correspond with the physical central axes or planes of the respective components.

Figure 3:
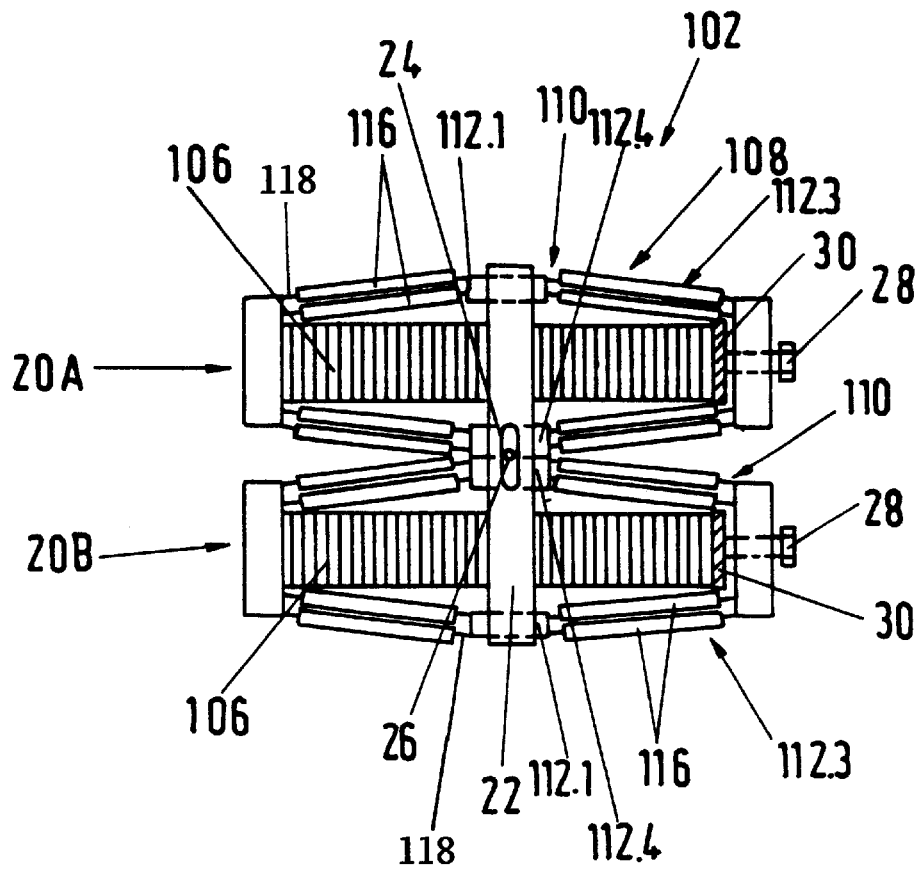
FIG. 3 schematically illustrates a tandem construction of actuators to form an actuator device according to a further embodiment of the invention.

In the further embodiment according to FIG. 3, the actuator device 102 includes two, tandem-arranged serially mechanically interconnected actuators 20A and 20B. The construction of each one of the actuators 20A and 20B generally corresponds to that described above, whereby corresponding components are designated by a reference number 100 greater than the corresponding reference number according to FIG. 1. Namely, each actuator 20A and 20B generally comprises an actuator element 106 and an octagonal transmission mechanism 108, in which the flexible joints 110 are multiply divided into individual hinge members 118 and the divided frame members 112.3 respectively comprise a plurality of separate individual link rods 116.

The two actuators 20A and 20B are arranged side-by-side with the actuator elements 106 extending parallel to each other. The adjacent frame members 112.4 are interconnected to act on a common output member 26, while the frame members 112.1 located distantly and facing away from each other are rigidly connected together by a metal bar or yoke 22. The rigid metal yoke 22 has a slot 24 extending therein, whereby the output member 26 is linearly slidably received in this slot 24.

In this embodiment, the two piezoelectric actuator elements 106 of the two actuators 20A and 20B are respectively oppositely electrically energized, namely the sum of the two actuating voltages applied to the actuators 20A and 20B constantly corresponds to the maximum operating voltage. The usable output force available at the output member 26 is double that of the output force provided by each individual actuator 20A or 20B, while the usable working stroke remains the same as that of each individual actuator 20A or 20B, for example according to FIG. 1.

The actuator assembly 102 according to FIG. 3 has the advantage that thermal elongations or expansions are self-compensating in the overall device, and a pre-biasing spring can be omitted. In order to adjust the zero position, an adjusting arrangement including an adjusting screw 28 and a pressure plate 30 can be provided between the transmission mechanism 108 and the actuator element 106 in each one of the actuators 20A and 20B, to provide an adjustment displacement effective in the lengthwise direction of the respective actuator element 106.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An actuator assembly
comprising two actuator devices, a rigid yoke interconnecting said actuator devices, and a common output element,
wherein each said actuator device comprises an electrically strainable solid state actuator element, first and second relative displacement output members, and a rod linkage coupling said output members to said actuator element such that said output members amplify a strain displacement of said actuator element,
wherein said first output members of said two actuator devices are arranged distally and oriented away from each other, and are respectively fixed to said rigid yoke, and
wherein said second output members of said two actuator devices are arranged proximately adjacent each other and are interconnected and connected to said common output element, which is relatively slidably coupled to said rigid yoke, so that an output displacement stroke of said common output element corresponds to an output displacement stroke of each one of said second output members and an output displacement force of said common output element corresponds to the sum of respective output displacement forces of said second output members.

2. The actuator assembly according to claim 1,
wherein said rod linkage of each said actuator device includes respective divided frame members coupling said first and second output members to said actuator element and divided flexible joints connecting said divided frame members to said output members,
wherein each said divided frame member comprises a plurality of adjacent parallel link rods, and
wherein each said flexible joint comprises a plurality of adjacent parallel hinge members that each respectively connect one of said link rods with a respective one of said output members.

3. The actuator assembly according to claim 1, expressly excluding any additional thermal compensating element.

4. An actuator arrangement including an actuator device comprising:
a solid state actuator element having a length that is adapted to be variable responsive to an electrical voltage being applied to said actuator element, whereby a first end of said actuator element is adapted to move through an initial displacement relative to a second end of said actuator element; and
a transmission mechanism that is coupled to said actuator element so as to be acted on by the initial displacement, and is adapted to provide an output displacement that is amplified relative to said initial displacement;
wherein said transmission mechanism comprises a plurality of rigid frame members including unitary frame members and divided frame members, and a plurality of elastically flexible joints that respectively join said unitary frame members with said divided frame members and that each respectively have a total joint cross-sectional area with a total joint tensile strength adapted to transmit a total rated load respectively through said flexible joint between a respective one of said unitary frame members and a respective one of said divided frame members that are joined by said respective flexible joint;
wherein said divided frame members each respectively comprise a plurality of individual link rods;
wherein each one of said flexible joints respectively comprises a plurality of adjacently extending elastically flexible hinge members that have respective hinge axes extending parallel to each other, and that are connected individually to respective individual ones of said link rods of a respective one of said divided frame members and are all connected in common to a respective single one of said unitary frame members, which integrally interconnects said hinge members of said respective one of said flexible joints;
wherein each one of said flexible hinge members has a respective hinge member cross-sectional area with a respective hinge member tensile strength that are inadequate to transmit said total rated load and correspond respectively to a fraction of said total joint cross-sectional area and to a fraction of said total joint tensile strength; and
wherein said hinge members respectively extend from ends of said link rods symmetrically along lengthwise-extending center planes of said link rods, such that axes of tensile and compressive forces effective in said link rods during operation of said actuator device are aligned along said center planes and through said hinge members.

5. The actuator arrangement according to claim 4, wherein each said flexible joint respectively consists of two of said hinge members, and each said divided frame member respectively consists of two of said link rods.

6. The actuator arrangement according to claim 5,
wherein said actuator device comprises a total of exactly eight of said rigid frame members including exactly four of said unitary frame members and exactly four of said divided frame members arranged and interconnected by a total of exactly eight of said flexible joints into an octagon linkage,
wherein two of said unitary frame members are respectively coupled to said first and second ends of said actuator element and two others of said unitary frame member are adapted to provide said output displacement and are arranged on a plane between said first and second ends of said actuator element,
wherein said divided frame members are respectively arranged extending between respective adjacent ones of said unitary frame members, and
wherein said link rods of each said divided frame member respectively have the same length and extend parallel to each other.

7. The actuator arrangement according to claim 4,
wherein said actuator device comprises a total of exactly eight of said rigid frame members including exactly four of said unitary frame members and exactly four of said divided frame members arranged and interconnected by a total of exactly eight of said flexible joints into an octagon linkage,
wherein two of said unitary frame members are respectively coupled to said first and second ends of said actuator element and two others of said unitary frame member are adapted to provide said output displacement and are arranged on a plane between said first and second ends of said actuator element,
wherein said divided frame members are respectively arranged extending between respective adjacent ones of said unitary frame members, and
wherein said link rods of each said divided frame member respectively have the same length and extend parallel to each other.

8. The actuator arrangement according to claim 4, wherein each said flexible joint respectively comprises at least three of said hinge members, each said divided frame member respectively comprises at least three of said link rods, and said at least three link rods of each said divided frame member respectively have the same length and extend parallel to each other.

9. The actuator arrangement according to claim 4, wherein said rigid frame members and said flexible joints are all together one integral part.

10. The actuator arrangement according to claim 4, further comprising a biasing spring arranged to pre-bias said transmission mechanism so as to pre-compress said actuator element.

11. The actuator arrangement according to claim 4, further including another one of said actuator devices, wherein said actuator devices are arranged mechanically in series with each other and are electrically connected to be respectively oppositely electrically energized, and further comprising a common output member connected to and coupling together an output of said transmission mechanisms of said actuator devices.

12. The actuator arrangement according to claim 4, wherein said link rods of each respective one of said divided frame members together with said unitary frame members adjacent to and connected to said respective divided frame member by respective ones of said hinge members form a respective parallelogram linkage.

13. An actuator arrangement including two actuator devices that each respectively comprise:
- a solid state actuator element having a length that is adapted to be variable responsive to an electrical voltage being applied to said actuator element, whereby a first end of said actuator element is adapted to move through an initial displacement relative to a second end of said actuator element; and
- a transmission mechanism that is coupled to said actuator element so as to be acted on by the initial displacement, and is adapted to provide an output displacement that is amplified relative to said initial displacement;
- wherein said transmission mechanism of each said actuator device respectively comprises a plurality of rigid frame members including unitary frame members and divided frame members, and a plurality of elastically flexible joints that respectively join said unitary frame members with said divided frame members and that each respectively have a total joint cross-sectional area with a total joint tensile strength adapted to transmit a total rated load respectively through said flexible joint between a respective one of said unitary frame members and a respective one of said divided frame members that are joined by said respective flexible joint;
- wherein said divided frame members each respectively comprise a plurality of individual link rods;
- wherein each one of said flexible joints respectively comprises a plurality of adjacently extending elastically flexible hinge members that have respective hinge axes extending parallel to each other, and that are connected individually to respective individual ones of said link rods of a respective one of said divided frame members and are all connected in common to a respective single one of said unitary frame members, which integrally interconnects said hinge members of said respective one of said flexible joints;
- wherein each one of said flexible hinge members has a respective hinge member cross-sectional area with a respective hinge member tensile strength that are inadequate to transmit said total rated load and correspond respectively to a fraction of said total joint cross-sectional area and to a fraction of said total joint tensile strength;
- wherein said actuator devices are arranged mechanically in series with each other and are electrically connected to be respectively oppositely electrically energized;
- wherein said actuator arrangement further includes a common output member connected to and coupling together an output of said transmission mechanisms of said actuator devices;
- wherein said actuator devices are arranged adjacent one another with respective first ones of said unitary frame members respectively of said actuator devices arranged distant and facing opposite one another and respective second ones of said unitary frame members respectively of said actuator devices arranged adjacent one another and connected to and coupled together by said common output member; and
- wherein said actuator arrangement further includes a rigid yoke bar that is rigidly connected to said first unitary frame members and connected to said common output member in such a manner to allow sliding displacement therebetween.

14. An actuator device comprising:
- an electrically strainable solid state actuator element having first and second ends that are displaceable relative to each other responsive to an electrically inducible strain in said actuator element;
- first and second unitary end blocks connected respectively to said first and second ends of said actuator element;
- an output member;
- first and second divided frame members that each respectively comprise a plurality of individual link rods that each respectively extend at an acute angle less than 45° relative to a lengthwise axis of said actuator element; and
- respective flexible joints flexibly connecting said first divided frame member to said first end block and to said output member and flexibly connecting said second divided frame member to said second end block and to said output member;
- wherein each said flexible joint respectively comprises a plurality of individual parallel hinge members that are respectively individually connected to respective individual ones of said link rods and that are all connected in common to a respective single one of said first end block, said second end block and said output member;
- wherein each said flexible joint has a total joint cross-sectional area with a total joint tensile strength adapted to transmit a total rated load respectively through said flexible joint;
- wherein each one of said hinge members has a respective hinge member cross-sectional area with a respective hinge member tensile strength that are inadequate to transmit said total rated load and correspond respectively to a fraction of said total joint cross-sectional area and to a fraction of said total joint tensile strength; and
- wherein said hinge members respectively extend from ends of said link rods symmetrically along lengthwise-extending center planes of said link rods, such that axes of tensile and compressive forces effective in said link rods during operation of said actuator device are aligned along said center planes and through said hinge members.

15. The actuator device according to claim 14, further comprising a second one of said output member, a second set of said first and second divided frame members, and a second set of said flexible joints arranged symmetrically about said lengthwise axis on an opposite side of said actuator element, such that said first end block, said first divided frame member, said first output member, said second divided frame member, said second end block, said second divided frame member of said second set, said second output member, and said first divided frame member of said second set form an octagonal linkage.

16. The actuator device according to claim 14, wherein each said divided frame member consists of exactly two of said link rods, and each said flexible joint consists of exactly two of said hinge members.

17. The actuator device according to claim 14, wherein each said divided frame member comprises at least three of said link rods, and each said flexible joint comprises at least three of said hinge members.

18. The actuator device according to claim 14, wherein all of said link rods of each respective one of said divided frame members respectively extend parallel to each other, and respectively have the same length.

19. The actuator device according to claim 14, wherein all of said rigid frame members and all of said flexible joints are together a single integral piece.

20. An actuator arrangement including two actuator devices that each respectively comprise:

an electrically strainable solid state actuator element having first and second ends that are displaceable relative to each other responsive to an electrically inducible strain in said actuator element;

first and second unitary end blocks connected respectively to said first and second ends of said actuator element;

an output member;

first and second divided frame members that each respectively comprise a plurality of individual link rods that each respectively extend at an acute angle less than 45° relative to a lengthwise axis of said actuator element; and respective flexible joints flexibly connecting said first divided frame member to said first end block and to said output member and flexibly connecting said second divided frame member to said second end block and to said output member;

wherein each said flexible joint respectively comprises a plurality of individual parallel hinge members that are respectively individually connected to respective individual ones of said link rods and that are all connected in common to a respective single one of said first end block, said second end block and said output member;

wherein each said flexible joint has a total joint cross-sectional area with a total joint tensile strength adapted to transmit a total rated load respectively through said flexible joint;

wherein each one of said hinge members has a respective hinge member cross-sectional area with a respective hinge member tensile strength that are inadequate to transmit said total rated load and correspond respectively to a fraction of said total joint cross-sectional area and to a fraction of said total joint tensile strength;

wherein said actuator devices are arranged mechanically in series with each other and are electrically connected to be respectively oppositely electrically energized;

wherein said actuator arrangement further includes a common output element connected to and coupling together said output members of said actuator devices;

wherein said actuator devices are arranged adjacent one another with said output members arranged adjacent one another and connected to and coupled together by said common output element; and wherein said actuator arrangement further includes a rigid yoke bar rigidly connected to said actuator devices and slidingly connected to said common output element in such a manner to allow sliding displacement therebetween.

* * * * *